United States Patent
Hatakeyama et al.

(10) Patent No.: US 8,830,351 B2
(45) Date of Patent: Sep. 9, 2014

(54) IMAGE PROCESSING METHOD AND IMAGE PROCESSING APPARATUS FOR IMAGE RESTORATION TO REDUCE A DETECTED COLOR SHIFT

(75) Inventors: Koshi Hatakeyama, Tokyo (JP); Akira Kano, Kawasaki (JP)

(73) Assignee: Canon Kabushiki Kaisha (JP)

( * ) Notice: Subject to any disclaimer, the term of this patent is extended or adjusted under 35 U.S.C. 154(b) by 219 days.

(21) Appl. No.: 13/327,959

(22) Filed: Dec. 16, 2011

(65) Prior Publication Data
US 2012/0154626 A1 Jun. 21, 2012

(30) Foreign Application Priority Data

Dec. 17, 2010 (JP) ................................. 2010-281843

(51) Int. Cl.
*H04N 9/73* (2006.01)
*G06K 9/40* (2006.01)

(52) U.S. Cl.
USPC ........................................ 348/223.1; 382/254

(58) Field of Classification Search
USPC .................. 348/222.1, 223.1, 241, 251, 335; 382/254, 260, 273, 276, 280
See application file for complete search history.

(56) References Cited

U.S. PATENT DOCUMENTS

| | | | |
|---|---|---|---|
| 7,667,738 B2 | 2/2010 | Utsugi | |
| 2010/0079626 A1* | 4/2010 | Hatakeyama | 348/241 |
| 2010/0271496 A1* | 10/2010 | Obu | 348/208.4 |
| 2011/0122283 A1* | 5/2011 | Nagata | 348/223.1 |
| 2011/0149103 A1* | 6/2011 | Hatakeyama et al. | 348/222.1 |
| 2011/0292257 A1* | 12/2011 | Hatakeyama | 348/242 |
| 2012/0105649 A1* | 5/2012 | Okada | 348/175 |

FOREIGN PATENT DOCUMENTS

| | | |
|---|---|---|
| JP | 06-113309 | 4/1994 |
| JP | 2006-020275 A | 1/2006 |
| JP | 2010-087671 A | 4/2010 |

OTHER PUBLICATIONS

JP OA issued Aug. 6, 2013 for corres. JP 2010-281843.

\* cited by examiner

*Primary Examiner* — Kelly L Jerabek
(74) *Attorney, Agent, or Firm* — Rossi, Kimms & McDowell LLP

(57) ABSTRACT

The image processing method includes a step of acquiring an input image produced by image capturing using an optical system, an image restoration step of performing an image restoration process on the input image to produce a restored image, the image restoration process using an image restoration filter produced based on an optical transfer function of the optical system, and a color shift detection step of detecting color shift included in the restored image, the color shift corresponding to chromatic aberration of magnification of the optical system. The method further includes a restored image color shift reduction step of performing a color shift reduction process on the restored image to reduce the color shift detected in the color shift detection step.

12 Claims, 11 Drawing Sheets

FIG. 3A
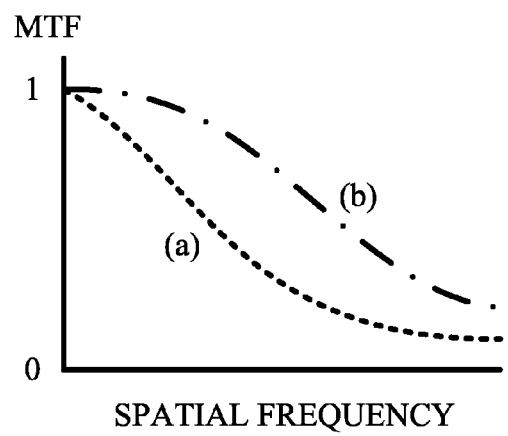
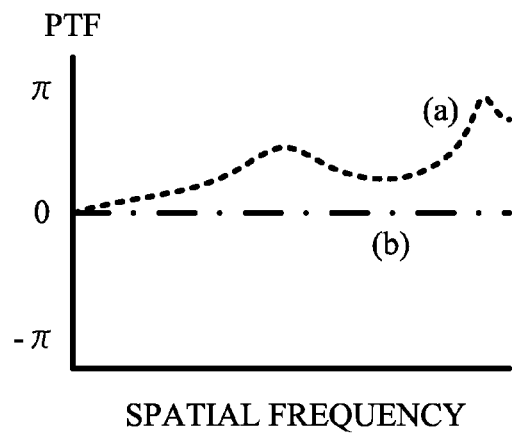
FIG. 3B
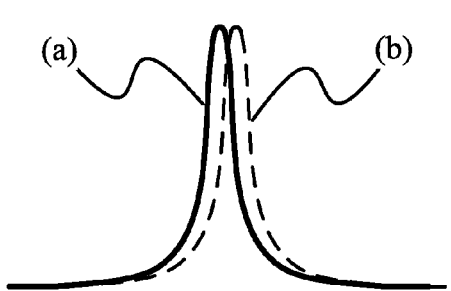
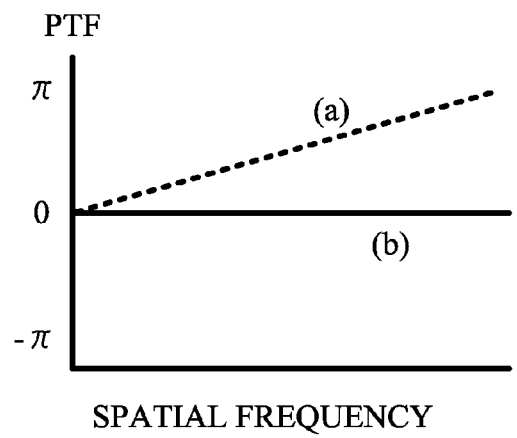
FIG. 3C
FIG. 3D X-AXIS : Gch IMAGE SURFACE ONE-SIDED
BLUR AMOUNT $\Delta def1 - \Delta def2$ X-AXIS : Gch IMAGE SURFACE
ONE-SIDED BLUR AMOUNT
$\Delta def1 - \Delta def2$ Y-AXIS : B-Gch MAGNIFICATION
CHROMATIC ONE-SIDED BLUR AMOUNT
$\Delta lat1 - \Delta lat2$

IMAGE RESTORATION FILTER

CORRECTION FILTER

NON-CORRECTED IMAGE RESTORATION FILTER

CORRECTED IMAGE RESTORATION FILTER

IMAGE PROCESSING METHOD AND IMAGE PROCESSING APPARATUS FOR IMAGE RESTORATION TO REDUCE A DETECTED COLOR SHIFT

BACKGROUND OF THE INVENTION

1. Field of the Invention

The present invention relates to an image processing technique for reducing an aberration component in an image produced by image capturing.

2. Description of the Related Art

Images produced by image pickup apparatuses such as digital cameras include a blur component (image blur component) that is a component of image degradation caused by various aberrations of an image capturing optical system (hereinafter simply referred to as an "optical system") such as spherical aberration, comatic aberration, field curvature and astigmatism. Such a blur component is generated because a light flux emitted from one point of an object forms an image with some divergence on an image pickup surface, the light flux being normally converged at one point if there is no aberration or diffraction.

The blur component herein is optically expressed as a point spread function (PSF), and is different from blur caused by defocusing. Moreover, color blur in a color image caused by longitudinal chromatic aberration, chromatic spherical aberration or chromatic comatic aberration of the optical system can be said to be a difference of blurring degrees for respective light wavelengths. Furthermore, color shift in a lateral direction caused by chromatic aberration of magnification of the optical system can be said as position shift or phase shift due to differences of image capturing magnifications for respective light wavelengths.

An optical transfer function (OTF) obtained by Fourier transform of the PSF is frequency component information of aberration, and is shown by a complex number. An absolute value of the OTF, that is, an amplitude component is called an MTF (Modulation Transfer Function), and a phase component is called a PTF (Phase Transfer Function). The MTF and the PTF respectively show a frequency characteristic of the amplitude component and a frequency characteristic of the phase component of the image degradation by the aberration. The phase component is defined as a phase angle by the following expression:

$$PTF = \tan^{-1}(Im(OTF)/Re(OTF))$$

where Re(OTF) and Im(OTF) respectively show a real part and an imaginary part of the OTF.

As described above, since the OTF of the optical system degrades the amplitude component and the phase component of the image, each points of the object in the degraded image is asymmetrically blurred like comatic aberration.

The chromatic aberration of magnification is generated by acquiring differences of image-forming positions of the respective light wavelengths due to differences of image-forming magnifications for the respective light wavelengths as color components such as R, G and B according to a spectrum characteristic of the image pickup apparatus. Accordingly, not only the differences of the image-forming positions among the color components (R, G and B), but also differences of image-forming positions of respective wavelengths in each color component, that is, image spread due to the phase shift are generated. To be exact, the chromatic aberration of magnification does not generate simple parallel color shift. However, description below will be made on the assumption that the chromatic aberration of magnification generates the color shift.

As a method for correcting (reducing) the degradation of the amplitude (MTF) and the degradation of the phase (PTF), there is known a correction method that uses information on the OTF of the optical system. This method is referred to as "image restoration", and a process for correcting (reducing) the degradation of the image by using the information on the OTF of the optical system is hereinafter referred to as "an image restoration process" or simply as "image restoration". There is known one image restoration process that performs convolution of an image restoration filter on an input image, the image restoration filter having a characteristic inverse to that of the OTF.

Moreover, there is known a method for correcting only the color shift in the image caused by the chromatic aberration of magnification, which performs a geometric (coordinate) transform process and a pixel interpolation process on pixel signals. For example, Japanese Patent Laid-Open No. 06-113309 discloses a method of correcting the color shift caused by the chromatic aberration of magnification for each of R, G and B according to a focal length of the optical system.

However, the method disclosed in Japanese Patent Laid-Open No. 06-113309 allows the color shift to remain due to insufficient correction or excessive correction of the color shift when the chromatic aberration of magnification is changed due to manufacturing variation of the optical system or variation of a spectrum characteristic of a light source in image capturing.

In regard to this point, a correction method disclosed in Japanese Patent Laid-Open No. 2006-020275 calculates a correlation of two color components included in RAW data to detect a color shift amount, and calculates chromatic aberration of magnification of an optical system on the basis of the color shift amount. That is, the method detects an actual color shift amount and performs color shift correction using the detected actual color shift amount, thereby making it possible to correct the color shift well according to the change of the chromatic aberration of magnification.

However, there is a case where the color shift correction cannot be sufficiently performed even by using the correction method disclosed by Japanese Patent Laid-Open No. 2006-020275. As described above, the chromatic aberration of magnification is generated due to not only the differences of the image-forming positions among the color components but also the image spread caused by the differences of the image-forming positions of the wavelengths in each color component, that is, the phase shift. For example, a G channel image that is an image of one of R, G and B color components includes a phase shift corresponding to chromatic aberration of magnification in a wavelength range in which a spectrum transmittance characteristic of a color filter of G has sensitivity. Thus, the image spread due to influence of the chromatic aberration of magnification of each wavelength that remains in each color component cannot be corrected even if the color shift among the color components can be corrected by the correction method disclosed in Japanese Patent Laid-Open No. 2006-020275.

In other words, the color shift correction performed by means of correction of image magnification of an image is locally equivalent to parallel translation of the image, so that it only corrects a linear component of the PTF which changes linearly with respect to frequency. Since an image of each color component includes asymmetric aberration such as comatic aberration, the PTF has a non-linear frequency characteristic. Thus, the parallel translation of the image of each color component cannot correct the asymmetry. Accordingly, in order to highly accurately correct the color shift due to the influence of the chromatic aberration of magnification of each wavelength that remains in each color component, it is necessary to also correct a non-linear component of the PTF which changes non-linearly with respect to the frequency.

SUMMARY OF THE INVENTION

The present invention provides an image processing method, an image processing program, an image processing apparatus and an image pickup apparatus that are capable of highly accurately correcting the asymmetric aberration generated in each color component and the color shift generated among the color components, and thereby capable of outputting a high quality restored image.

The present invention provides as an aspect thereof an image processing method including a step of acquiring an input image produced by image capturing using an optical system, an image restoration step of performing an image restoration process on the input image to produce a restored image, the image restoration process using an image restoration filter produced based on an optical transfer function of the optical system, a color shift detection step of detecting color shift included in the restored image, the color shift corresponding to chromatic aberration of magnification of the optical system, and a restored image color shift reduction step of performing a color shift reduction process on the restored image to reduce the color shift detected in the color shift detection step.

The present invention provides as another aspect thereof a computer-readable storage medium storing an image processing program executed by a computer. The image processing program includes a step of acquiring an input image produced by image capturing using an optical system, an image restoration step of performing an image restoration process on the input image to produce a restored image, the image restoration process using an image restoration filter produced based on an optical transfer function of the optical system, a color shift detection step of detecting color shift included in the restored image, the color shift corresponding to chromatic aberration of magnification of the optical system, and a restored image color shift reduction step of performing a color shift reduction process on the restored image to reduce the color shift detected in the color shift detection step.

The present invention provides as still another aspect thereof an image processing apparatus including an image acquiring part configured to acquire an input image produced by image capturing using an optical system, an image restoring part configured to perform an image restoration process on the input image to produce a restored image, the image restoration process using an image restoration filter produced based on an optical transfer function of the optical system, a color shift detecting part configured to detect color shift included in the restored image, the color shift corresponding to chromatic aberration of magnification of the optical system; and a restored image color shift reducing part configured to perform a color shift reduction process on the restored image to reduce the color shift detected by the color shift detecting part.

The present invention provides as yet still another aspect thereof an image pickup apparatus including an image pickup system configured to photoelectrically convert an object image formed by an optical system to produce an image, and the above-described image processing apparatus that acquires the produced image as the input image.

Further features and aspects of the present invention will become apparent from the following description of exemplary embodiments with reference to the attached drawings.

BRIEF DESCRIPTION OF THE DRAWINGS

FIG. 3A shows a correction state of a point image.

FIG. 3B shows an MTF (amplitude) and a PTF (phase).

FIGS. 3C and 3D show chromatic aberration of magnification.

DESCRIPTION OF THE PREFERRED EMBODIMENTS

Figure 1:
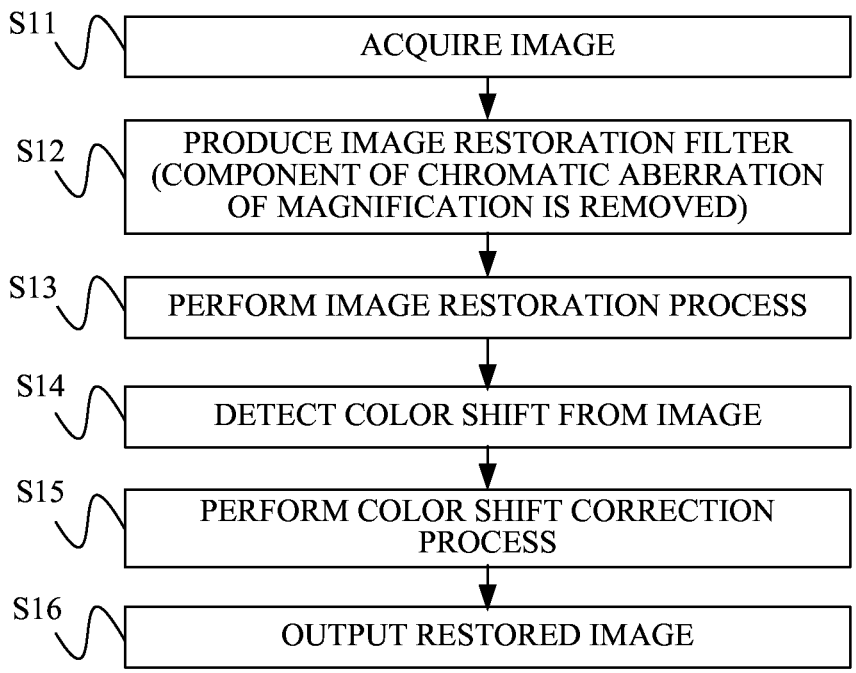
FIG. 1 is a flowchart showing a sequence of an image processing method that is an embodiment of the present invention.

Exemplary embodiments of the present invention will hereinafter be described with reference to the accompanying drawings.

First of all, before description of specific embodiments, definitions of terms being used in each embodiment and image processing being performed in each embodiment will be described.

"Input Image"

The input image is a digital image obtained by photoelectrically converting an object image (optical image), which is formed by an image capturing optical system, by an image sensor (image pickup element) such as a CCD sensor or a CMOS sensor. The object image is formed by light passing through the image capturing optical system, so that it is degraded due to aberrations (that is, an optical transfer function (OTF)) generated at lenses and an optical filter constituting the image capturing optical system. The image capturing optical system may include not only lenses but also a mirror (reflective surface) having a curvature.

The image processing that will be described below in each embodiment may be performed in an image production apparatus having no image capturing optical system. For example, though a scanner (image reader) performing image capturing in a state where an image sensor is in close contact with an object surface and an X-ray image pickup apparatus have no image capturing optical system such as a lens, their image sampling or the like through the image sensor at least slightly degrades an output image. Such degradation of the output image is not caused by the image capturing optical system, but can be regarded as being caused by an image capturing system transfer function, and therefore corresponds to the optical transfer function (OTF). Thus, the image processing that will be described in each embodiment can be used in various apparatuses having no image capturing optical system as long as an image restoration filter is produced based on the transfer function. For convenience in description, each embodiment describes such a broad-sense transfer function of the image capturing system as "the optical transfer function (OTF)".

The transfer function of the image reader includes, for example, degradation caused by an aperture shape of a light-receiving part of the image sensor, aberration of a microlens placed in the light-receiving part and aberration generated by a cover glass. A finite size aperture shape of the light-receiving part has a transfer characteristic similar to, for example, that of a low-pass filter.

Moreover, the input image has information on two or more color components such as R, G and B. The color components can be expressed by a selected one of generally used color spaces, which are other than the RGB color space, such as an LCH (lightness, chroma and hue) color space or a YCbCr (brightness and color differences) color space. It is also possible to use XYZ, Lab, Yuv and JCh as the color space. In addition, it is also possible to use color temperature.

Furthermore, it is possible to add, to the input image and an output image, image capturing condition information such as a focal length of the image capturing optical system, an aperture value thereof and an object distance, and various information necessary for the image processing. In a case of performing the image processing on the input image sent from the image pickup apparatus to an image processing apparatus separate therefrom, it is desirable to add, to the input image, the image capturing condition information and the information necessary for the image processing. The image capturing condition information and the information necessary for the image processing may be sent from the image pickup apparatus to the image processing apparatus by connecting them directly or indirectly.

"Image Restoration Process"

The outline of the image restoration process is as follows. When $g(x, y)$ represents a degraded image (input image), $f(x, y)$ represents an non-degraded original image, $h(x, y)$ represents a point spread function (PSF) that forms a Fourier pair with the optical transfer function, * represents convolution, and $(x, y)$ represents coordinates on the image, the following expression is established:

$$g(x,y)=h(x,y)*f(x,y).$$

Moreover, converting the above expression into a form of a two-dimensional frequency surface by Fourier transform provides the following expression of a form of a product for each frequency:

$$G(u,v)=H(u,v) \cdot F(u,v)$$

where H indicates a result of Fourier transform of the point spread function (PSF), in other words, the optical transfer function (OTF), G and F indicate results of Fourier transform of g and f, and (u, v) indicates coordinates on the two-dimensional frequency surface, in other words, a frequency.

In order to acquire the original image from the degraded image, both sides of the expression is divided by H as below:

$$G(u,v)/H(u,v)=F(u,v).$$

Returning the F(u, v) through inverse Fourier transform to a real surface enables acquisition of a restored image equivalent to the original image f(x, y).

When R represents a result of inverse Fourier transform of $H^{-1}$, performing a convolution process on the image in the real surface as represented by the following expression similarly enables acquisition of the original image:

$$g(x,y)*R(x,y)=f(x,y).$$

This R(x, y) is referred to as an "image restoration filter".

When the image is a two-dimensional image, the image restoration filter is generally produced as a two-dimensional filter having taps (cells) corresponding to respective pixels of the image. Moreover, increase of the number of the taps (cells) of the image restoration filter generally further improves image restoration accuracy, so that the number of the taps is set to a realizable number depending on a required image quality, an image processing performance, an aberration characteristic and the like.

Since it is necessary that the image restoration filter reflect at least the aberration characteristic, the image restoration filter is different from conventional edge emphasis filters (high-pass filter) having about three taps horizontally and vertically. The image restoration filter is produced based on the optical transfer function (OTF), so that it can highly accurately correct an amplitude component and a phase component of the degraded image.

Moreover, since an actual image includes a noise component, use of an image restoration filter produced by using an inverse of the optical transfer function (OTF) amplifies the noise component together with the degraded image, which generally makes impossible to obtain a good quality restored image. This is because such an image restoration filter raises an MTF (amplitude component) of an optical system so as to return it to 1 in the entire frequency range in a state where amplitude of the noise component is added to the amplitude component in the image.

In other words, not only the MTF as the amplitude component degraded by the optical system is returned to 1, but also a power spectrum of the noise component is raised, which results in the amplification of the noise component according to a raising level (restoration gain) of the MTF.

Accordingly, it is difficult to obtain a good quality restored image when the restored image includes the noise component. The above problem is shown by the following expression where N represents the noise component:

$$G(u,v)=H(u,v) \cdot F(u,v)+N(u,v)$$

$$G(u,v)/H(u,v)=F(u,v)+N(u,v)/H(u,v)$$

As a solution of the above problem, there is known a method of controlling a restoration degree according to an intensity ratio (SNR) of an image signal and a noise signal by using, for example, a Wiener filter shown by the following expression (1) where M(u, v) represents a frequency characteristic of the Wiener filter and |h(u, v)| represents an absolute value (MTF) of the optical transfer function (OTF):

$$M(u, v) = \frac{1}{H(u, v)} \frac{|H(u, v)|^2}{|H(u, v)|^2 + SNR^2}. \quad (1)$$

The method reduces the restoration degree (restoration gain) as the MTF reduces in each frequency, that is, increases the restoration gain as the MTF increases. Since the MTF of the image capturing optical system is generally smaller on a low frequency side and is higher on a high frequency side, the method substantially suppresses the restoration gain on the high frequency side of the image.

Figures 2A, 2B:
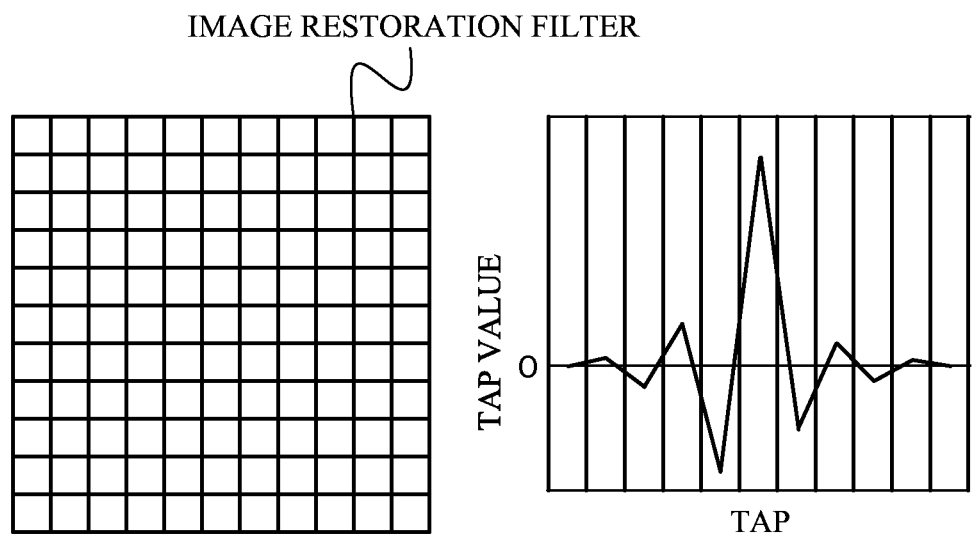
FIGS. 2A and 2B show an image restoration filter used in the image processing sequence.

FIG. 2A schematically shows an example of the image restoration filter. In the image restoration filter, the number of the taps is determined according to the aberration characteristic of the image capturing optical system and the required restoration accuracy. The image restoration filter shown in FIG. 2A is a two-dimensional filter including 11×11 taps. FIG. 2A omits values (coefficients) of the respective taps.

FIG. 2B shows one cross section of this image restoration filter. The distribution of the values (coefficients) of the respective taps in the image restoration filter has a roll to ideally return signal values (PSF), which is spatially spread due to the aberration, to original one point.

Each tap of the image restoration filter corresponds to each pixel of the degraded image, and convolution of the value of each tap is performed on the degraded image in the image restoration process (convolution process). In the convolution process, in order to improve a signal value of a target pixel in the degraded image, the target pixel is matched to a central tap of the image restoration filter. Then, a product of the coefficient of each tap in the image restoration filter and the signal value of each corresponding pixel in the degraded image is calculated, and a sum total of the products is replaced as a signal value of the target pixel matched to the central tap.

Description will be made of characteristics of the image restoration process in a real space and a frequency space with reference to FIGS. 3A to 3D. FIG. 3A shows (a) an example of the PSF before the image restoration and (b) an example of the PSF after the image restoration. Moreover, FIG. 3B show (a) examples of the MTF and PTF before the image restoration and (b) examples of the MTF and PTF after the image restoration.

The PSF before the image restoration asymmetrically spreads, which changes the PTF nonlinearly with respect to frequency. The image restoration process amplifies the MTF to reduce the PTF toward 0, which makes the PSF after the image restoration symmetric and sharp.

The image restoration filter can be produced by performing inverse Fourier transform on a function designed based on an inverse function of the optical transfer function (OTF) of the image capturing optical system. The image restoration filter to be used in the embodiments may be arbitrarily changed, and, for example, the Wiener filter can be used. When using the Wiener filter, performing the inverse Fourier transform on the expression (1) enables production of the image restoration filter to be actually used for the convolution on the degraded image in the real space.

Next, description will be made of a color shift due to chromatic aberration of magnification. FIG. 3C shows (a) an example of the PSF of a first color component forming an image at a reference position and (b) an example of the PSF of a second color component having a same PSF shape as that of the first color component and forming an image at a position parallel translated from the reference position. FIG. 3D shows (a) the PTF of the first color component shown by (a) in FIG. 3C, and shows (b) the PTF of the second color component shown by (b) in FIG. 3C. The PTF shown by (b) in FIG. 3D is a straight line having a certain gradient. The image restoration filter is produced based on the original OTF including such a linear PTF as well as the nonlinear PTF shown by (a) in FIG. 3B, and therefore can correct the linear PTF as shown by (b) in FIG. 3D.

Moreover, based on an OTF (corrected OTF) in which a linear component is removed from the PTF in advance, the image restoration filter can be produced which has no effect of correcting the color shift that is a parallel translated component of the chromatic aberration of magnification. In other words, the image restoration filter can be produced from such a corrected OTF in which the linear component corresponding to the chromatic aberration of magnification is removed from a frequency characteristic of the phase of the OTF.

On the other hand, when the effect of correcting the color shift is removed from the image restoration filter in the real space, a PSF is first produced by parallel translating the PTF shown by (b) in FIG. 3C to the position of the PTF shown by (a). In other words, the image restoration filter is produced based on a PSF (corrected PSF) in which a difference between the PSFs of the color components is reduced by a relative parallel translation of the PSFs. In the production of this image restoration filter, pixel interpolation is arbitrarily used. Performing the Fourier transform on the corrected PSF can produce an OTF from which a component of the chromatic aberration of magnification is removed. Since the shapes of the PSFs shown by (a) and (b) are actually different from each other, methods for matching the position thereof include, for example, a method of matching their centroids and a method of minimizing a mean square of their difference. Then, use of the corrected OTF enables production of the image restoration filter having no effect of correcting the color shift.

Thus, the removal of the correction effect for the color shift due to the chromatic aberration of magnification from the image restoration filter enables separation of a process to correct asymmetric aberration for each color component and a process to sharpen the image (image restoration process) from a process to correct the color shift due to the chromatic aberration of magnification (color shift reduction process). This process separation can detect, even when a color shift amount and sharpness of the image are not design values, the sharpness and the color shift amount from the image to set an appropriate correction amount based on the detection results.

Furthermore, since the optical transfer function (OTF) is changed according to an image height of the image capturing optical system (that is, a position in the image) even in a same image capturing condition, it is desirable to change the image restoration filter according to the image height.

"Detection and Correction of Color Shift (Chromatic Aberration of Magnification)"

Description will be made of a sequence of the color shift correction process (color shift reduction process) for detecting the color shift due to the chromatic aberration of magnification from the image and for correcting (reducing) it with reference to a flowchart shown in FIG. 4.

First of all, at an image acquisition step S01, the process acquires an image that is a process target image in the color shift correction process. Although the process target image in the color shift correction process in the following embodiments is a restored image produced by the image restoration process using the image restoration filter from a captured image that is an original input image, the process target image herein is referred to as "an input image" for the sake of expedience.

Next, at an edge detection step S02, the process detects from the input image an edge where the color shift due to the chromatic aberration of magnification remarkably appears. The process detects a plurality of the edges. The detection of the edge is performed by using a Y (luminance) plane. The plural edges detected by this process are limited to ones whose pixel value significantly changes in a radial direction from an optical center, which enables acquisition of a highly accurate color shift amount.

Moreover, since the color shift due to the chromatic aberration of magnification appears as blur in the Y plane, it is desirable to detect edges having a certain width where the pixel value monotonically increases or decreases over plural pixels.

Next, at a color shift amount detection step S03, the process detects the color shift amount of each edge detected at the edge detection step S02. For simplification of the process, the color shift amount detection may be performed in a direction selected depending on a positional relationship between the optical center and each edge, from a vertical direction, a horizontal direction, an obliquely right upward (obliquely left downward) direction and an obliquely left upward (obliquely right downward) direction.

The color shift amount detection at each edge uses a correlation between the color components. The color shift amount can be detected by, for example, determining a sum of absolute values of differences between the color components. With movement of an R plane (or a B plane) with respect to a G plane, among pixels near the edge, a pixel (position) where the sum of the absolute values of the differences between the color components becomes minimum is searched for. From the detected position where the sum of the absolute values of the differences between the color components becomes minimum, the color shift amount of the R plane (or the B plane) with respect to the G plane.

The color shift amount output at the color shift amount detection step S03 is a negative value when the R plane (or the B plane) is shifted toward the optical center with respect to the G plane, and is a positive value when the R plane (or the B plane) is shifted toward an opposite side to the optical center with respect to the G plane.

Next, at a correction data production step S04, the process calculates a relationship between the image height and the color shift amount, from the image heights of the edges detected at the edge detection step S02 and the color shift amounts at the respective edges detected at the color shift amount detection step S03. Then, the process produces color shift correction data from that relationship. The image height herein is a distance from a pixel corresponding to the optical center. The pixel corresponding to the optical center is hereinafter also referred to as "the optical center".

Detailed description will hereinafter be made of a procedure for producing the color shift correction data.

(1) The process calculates a color shift rate M to the image height by using the following expression where L represents the image height of the edge detected at the edge detection step S02, and D represents the color shift amount detected at color shift amount detection step S03:

$$M=L/D.$$

Figure 5A:
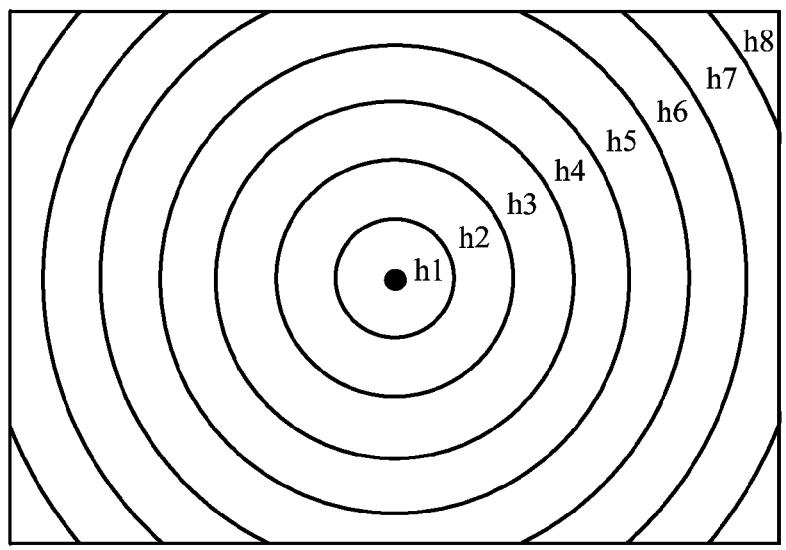
FIGS. 5A and 5B show the color shift correction process in the image processing sequence.

(2) The process divides the input image, as shown in FIG. 5A, into eight concentric areas h1 to h8 whose image heights are mutually different, and determines the area in which each edge exists.

(3) The process performs the above steps (1) and (2) for the plural edges detected in the input image, and tallies the color shift rates M in each of the eight areas h1 to h8. Then, the process calculates a mean value of the color shift rates M in each of the eight areas h1 to h8 to decide the color shift rate of each of the eight areas h1 to h8. Although FIG. 5A shows the case of dividing the input image into the plural concentric areas, the input image may be subdivided radially from the optical center so as to segmentalize the areas where the color shift rates M are calculated. Such segmentalization enables, when the color shift amounts are asymmetric in the horizontal direction, production of the color shift correction data corresponding to the asymmetry.

Figure 5B:
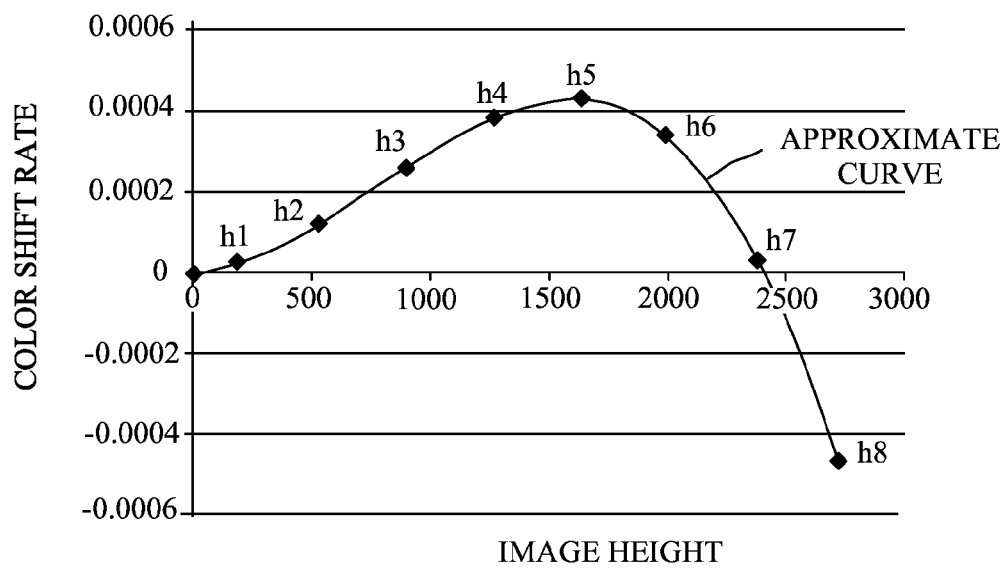

(4) The process calculates, from the image heights and the decided color shift rates of the respective areas h1 to h8, a high-order polynomial approximate expression F that expresses a curved line approximating the relationship between the image heights and the color shift rates as shown in FIG. 5B, and sets this approximate expression F to the color shift correction data. The approximation curve shown in FIG. 5B is expressed by a third-order polynomial expression.

The edge detection and the color shift amount detection may be performed for all edges in the input image. However, it is desirable to finish the edge detection and the color shift amount detection when a predetermined number of the color shift rates is tallied in each of the eight areas divided according to the image heights. This makes it possible to increase process efficiency while maintaining reliability.

Moreover, using only the areas where appropriate edges are found, out of the eight areas divided according to the image heights, for calculating the high-order polynomial approximate expression enables production of the color shift correction data even when there exists at least one area where the appropriate edges are not found.

Figure 4:
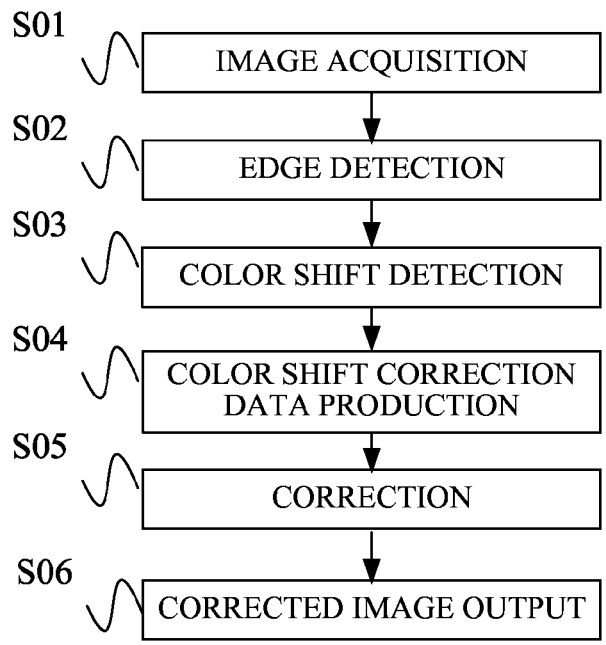
FIG. 4 is a flowchart of a color shift correction process in the image processing sequence.

Next, at a correction step S05 shown in FIG. 4, the process performs color shift correction by using the color shift correction data produced at the color shift correction data production step S04. Specifically, the process calculates, at a pixel (X, Y) (coordinates of the optical center are denoted by (0, 0)) in a plane (R or B plane) to be corrected, the color shift rate M from the image height L of that pixel (X, Y) by using the following polynomial approximate expression F:

$$M=F(L).$$

Next, the process calculates coordinates (X1,Y1) of a pixel produced by the color shift correction by using the following expressions:

$$X1=M \times X$$

$$Y1=M \times Y.$$

Then, the process produces, in the plane to be corrected, a pixel value corresponding to the above-mentioned coordinates (X1,Y1) by a general interpolation process, and sets the calculated pixel value to the pixel value of the pixel (X, Y). The process performs such color shift correction on all pixels in the input image.

Next, at a corrected image output step S06, the process outputs the image (corrected image) whose color shift has been corrected by using the color shift correction data at the correction step S05.

Embodiment 1

Figure 6:
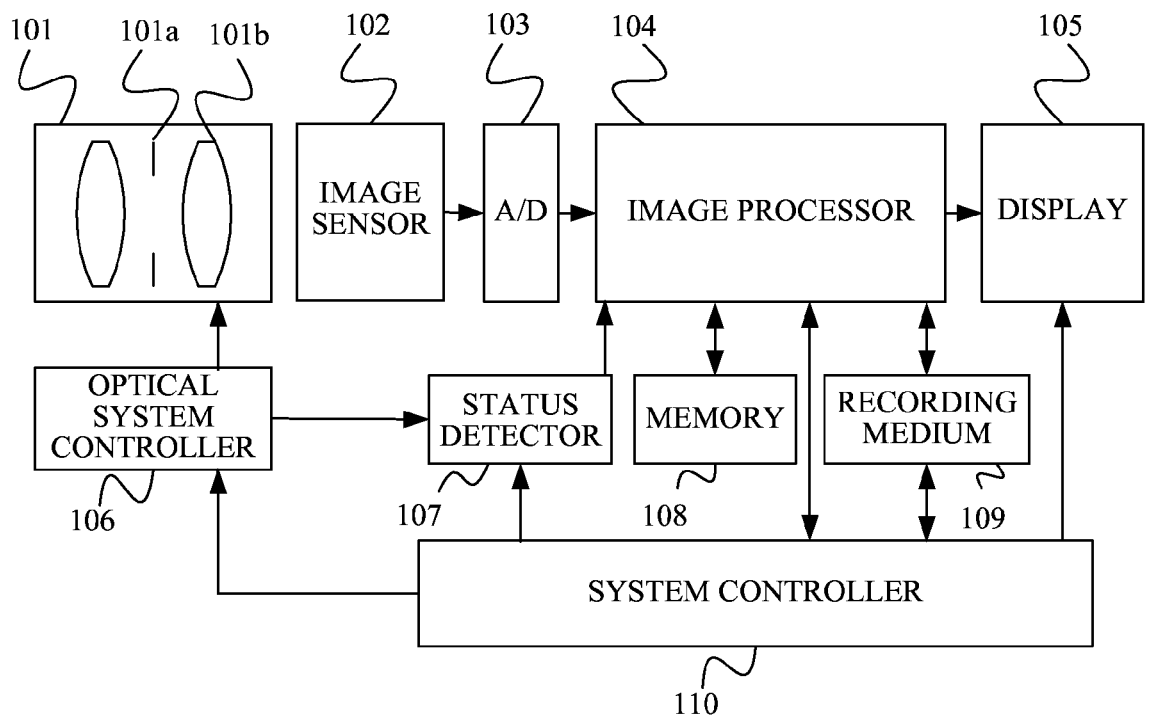
FIG. 6 is a block diagram showing the configuration of an image pickup apparatus that is Embodiment 1 of the present invention.

FIG. 6 shows the configuration of an image pickup apparatus performing image processing according to the image processing method that is a first embodiment (Embodiment 1) of the present invention.

Light from an object (not shown) passing through an image capturing optical system 101 reaches an image sensor (image pickup element) 102 to form an object image thereon. The object image is converted into an electric signal (analogue signal) by the image sensor 102, and the analogue signal is converted into a digital image pickup signal by an A/D converter 103 and input to an image processor 104 as an image processing apparatus.

The image processor 104 performs various processes on the digital image pickup signal to produce a captured image as an input image (that is, to acquire the captured image), and performs the above-described image restoration process on the captured image.

The image processor 104 first acquires, from a status detector 107, information on an image capturing condition (hereinafter referred to as "image capturing condition information") such as a setting status of the image pickup apparatus at image capturing (at acquisition of the captured image). The image capturing condition information includes a focal length of the image capturing optical system 101, an aperture value thereof and an image capturing distance (object distance) that is a distance to the object.

The status detector 107 may obtain the image capturing condition information from a system controller 110, or may obtain part of the image capturing condition information relating to the image capturing optical system 101 from an optical system controller 106. The image processor 104 may read the image capturing condition information added to the captured image when performing the image processing on the captured image stored in a recording medium 109. The recording medium 109 is constituted by a semiconductor memory or the like.

Next, the image processor 104 selects one image restoration filter corresponding to the image capturing condition information that is obtained from the status detector 107 or that is added to the captured image, from plural image restoration filters that have been produced so as to correspond to various image capturing conditions in advance to be stored in a memory 108. Then, the image processor 104 performs the image restoration process using the selected image restoration filter on the captured image, and further performs the color shift correction process (restored image color shift reduction process) on the restored image produced by the image restoration process. Detailed description of these processes will be described below.

Next, the image processor 104 stores an output image that is the restored image on which the image restoration process and the color shift correction process have been performed, to the recording medium 109. Moreover, a display 105 displays the output image.

The image processor 104 is constituted by a computer serving as an image acquiring part, an image restoring part, a color shift detecting part and a restored image color shift reducing part.

The above-described production of the digital image and the image restoration and color shift correction processes performed by the image processor 104 are controlled by the system controller 110. Moreover, zoom drive and focus drive of the image capturing optical system 101 are controlled by the optical system controller 106 that receives instructions from the system controller 110.

In the image capturing optical system 101, an aperture stop 101*a* increases and decreases its aperture diameter (F-number) to adjust an amount of light reaching the image sensor 102. A focus lens 101*b* is subjected to adjustment of its position in an optical axis direction by an autofocus (AF) function of the optical system controller 106 or through a manual focus mechanism to perform focusing. A zoom lens (not shown) is subjected to adjustment of its position in the optical axis direction by a zoom function of the optical system controller 106 or through a manual zoom mechanism to change the focal length of the image capturing optical system 101.

The image capturing optical system 101 may include optical filters such as a low-pass filter and an infrared cutting filter. If the optical filter influences the optical transfer function (OTF) of the image capturing optical system 101, it is necessary to consider the optical filter in production of the image restoration filter. Since the infrared cutting filter influences PSFs (Point Spread Functions) in R, G and B channels (particularly, the PSF of the R channel) that are values of integral of PSFs for spectrum wavelengths, it is necessary to consider the infrared cutting filter in production of the image restoration filter.

Moreover, the image capturing optical systems 101 may constitute part of the image pickup apparatus, or may be interchangeable with respect to the image pickup apparatus such as a single-lens reflex camera.

Next, description will be made of the image processing including the image restoration and color shift correction processes performed by the image pickup apparatus (image processor 104) with reference to a flowchart shown in FIG. 1. The image processor 104 as the computer performs the image processing according to an image processing program as a computer program.

At step S11, the image processor 104 acquires the captured image that has produced by the image processor 104 itself or that is read from the recording medium 109, as the input image. The image processor 104 also acquires the image capturing condition information corresponding to the captured image.

Next, at step S12, the image processor 104 selects from the memory 108 one image restoration filter corresponding to the image capturing condition (actual image capturing condition) obtained from the image capturing condition information. If no image restoration filter corresponding to the actual image capturing condition is stored in the memory 108, a new image restoration filter corresponding to the actual image capturing condition can be produced by using one or more stored image restoration filters corresponding to one or more image capturing conditions near the actual image capturing condition.

For example, the image restoration filter corresponding to the actual image capturing condition can be produced by performing an interpolation process by using, of plural image restoration filters corresponding to various discrete image capturing conditions, two image restoration filters corresponding to two image capturing conditions near the actual image capturing condition. The interpolation process can be performed by using bilinear interpolation (linear interpolation) or bicubic interpolation.

Furthermore, the image restoration filter corresponding to the actual image capturing condition may be produced by using data stored in the memory 108 and necessary for producing image restoration filters such as PSFs, OTFs, MTFs, PTFs or frequency characteristics of the image restoration filter.

The image restoration filter used in this embodiment is a filter from which the effect of correcting (reducing) the color shift that is a parallel translation component between the color components in the chromatic aberration of magnification is removed. In other words, the image restoration filter used in this embodiment is a filter that corrects the asymmetric aberration and sharpens the image, but does not correct the color shift.

Next, at step S13, the image processor 104 performs the image restoration process on the captured image by using the image restoration filter that has been selected or produced at step S12 to acquire a restored image. Since the image restoration filter does not correct the color shift, the restored image in which the asymmetric aberration has been corrected and which has been sharpened but in which the color shift due to the chromatic aberration of magnification remains is acquired.

Figure 7:
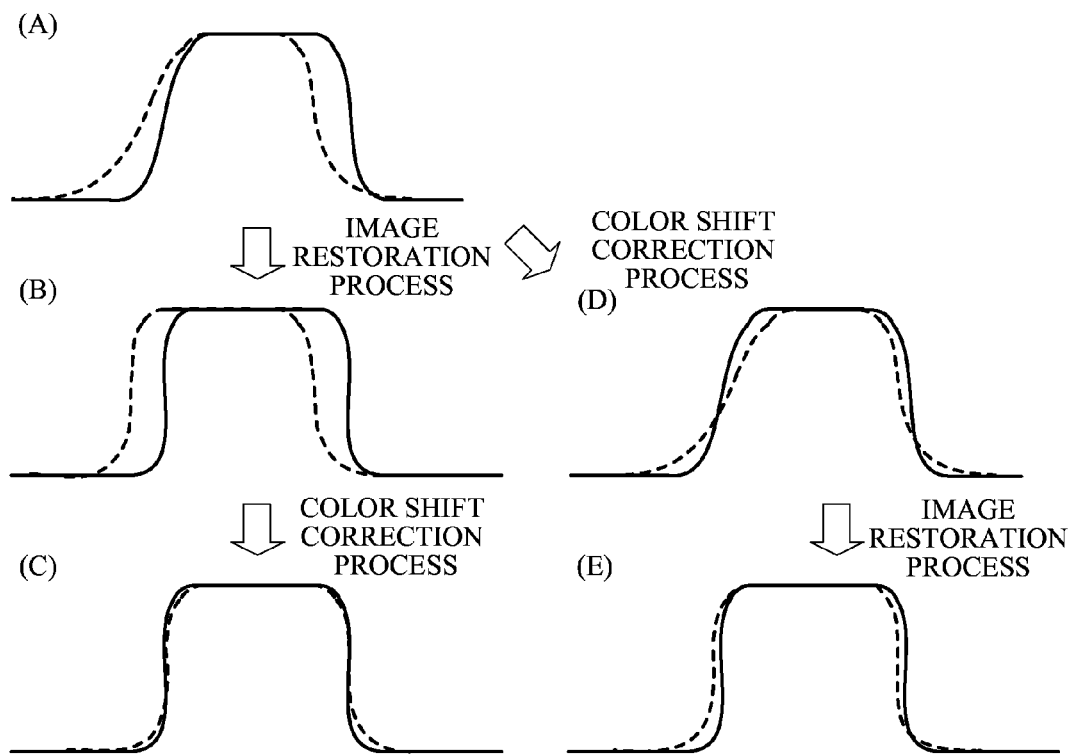
FIG. 7 shows effects of the image processing sequence in the image pickup apparatus of Embodiment 1.

In FIG. 7, (A) schematically shows edges in a meridional section of the captured image, the meridional section being a section cut in a radial direction from a center of the captured image. A solid line and a broken line show two color components in the captured image. In FIG. 7, (B) shows a restored image in which the asymmetric aberration of each color component has been corrected and which has been sharpened by the image restoration process performed at step S13, but in which the color shift remains.

Next, at step S14, the image processor 104 detects the color shift amount from the restored image. That is, the image processor 104 detects a shift amount between the two color components in the restored image shown by (B) in FIG. 7.

Next, at step S15, the image processor 104 performs the color shift correction process on the restored image to reduce the color shift amount detected at step S14 to produce a color shift corrected restored image. That is, performing the color shift correction process on the restored image shown by (B) in FIG. 7 produces the color shift corrected restored image shown by (C) in FIG. 7. This color shift corrected restored image is an image in which the asymmetric aberration of each color component has been corrected and which has been sharpened by the image restoration process performed at step S13, and in which the color shift that remained at step S15 has been corrected. Then, at step S16, the image processor 104 outputs the color shift corrected restored image.

On the other hand, when the color shift amount detection and the color shift correction process are first performed on the captured image shown by (A) in FIG. 7, which is different from this embodiment, an image shown by (D) in FIG. 7 is acquired. This image is an image in which the color shift has been corrected such that the color shift becomes as unnoticeable as possible while the asymmetric aberration remains and thereby aberrations at right and left edges are mutually different. Then, performing the image restoration process on such an image in which the asymmetric aberration remains produces an image shown by (E) in FIG. 7 in which the asymmetric aberration of each color component has been corrected at the edges and which has been sharpened, but the color shift between the color components remains.

This is because the color shift amount detection is performed on the edge where the asymmetric aberration remains as shown by (A) in FIG. 7 and therefore an inappropriate color shift correction amount is set for the edge on which the image restoration process is finally performed. The color shift at the sharpened edge is more noticeable than that at the blurred edge shown by (A). Thus, performing the processes in order of (A), (D) and (E) shown in FIG. 7 is inappropriate for producing a higher quality image.

Moreover, the restoration gain (restoration degree) of the image restoration process is changed by design of the image restoration filter, so that the remaining color shift shown by (E) in FIG. 7 is changed according to the restoration gain. Furthermore, manufacturing variation and variation of a light source spectrum make it more complex and more difficult to predict the state of the edge after the image restoration process. Thus, performing the processes in order of (A), (B) and (C) shown in FIG. 7 is appropriate for producing a higher quality image.

Figure 8:
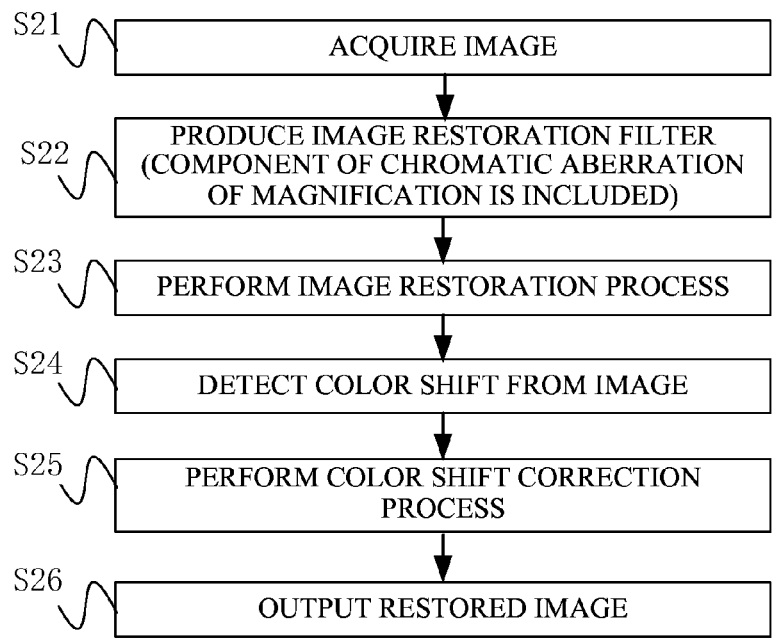
FIG. 8 is a flowchart of Modified Example 1 of the image processing sequence described in Embodiment 1.

Next, a modified example of this embodiment will be described with reference to a flowchart shown in FIG. 8. At step S21, the image processor 104 acquires the captured image that has produced by the image processor 104 itself or that is read from the recording medium 109, as the input image. The image processor 104 also acquires the image capturing condition information corresponding to the captured image.

Next, at step S22, the image processor 104 selects from the memory 108 one image restoration filter corresponding to the actual image capturing condition obtained from the image capturing condition information. If no image restoration filter corresponding to the actual image capturing condition is stored in the memory 108, a new image restoration filter corresponding to the actual image capturing condition can be produced by the same method as that used at step S12 in FIG. 1.

The image restoration filter used in this modified example is a filter having the effect of correcting the color shift that is a parallel translation component between the color components in the chromatic aberration of magnification. In other words, the image restoration filter used in this modified example is a filter that corrects the asymmetric aberration, sharpens the image and further corrects at least part of the color shift. The effect of correcting the color shift can be obtained by treating the parallel translation component of the chromatic aberration of magnification as part of the PTF.

Next, at step S23, the image processor 104 performs the image restoration process on the captured image by using the image restoration filter that has been selected or produced at step S22 to acquire a restored image. Since the image restoration filter corrects the color shift, the restored image in which the asymmetric aberration has been corrected, which has been sharpened and in which at least part of the color shift due to the chromatic aberration of magnification has been corrected is acquired.

Figure 9:
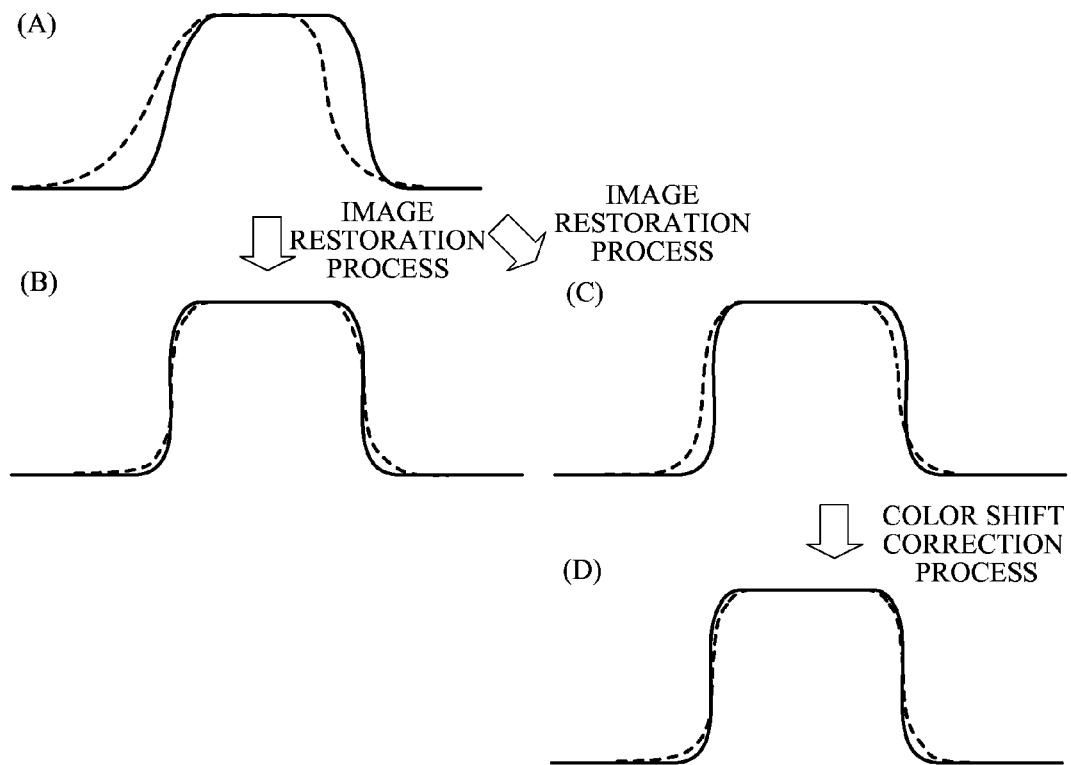
FIG. 9 shows effects of Modified Example 1.

In FIG. 9, (A) schematically shows edges in a meridional section of the captured image. A solid line and a broken line show two color components in the captured image. As shown by (B) in FIG. 9, the image restoration process performed at step S23 produces a restored image (color shift corrected restored image) in which the asymmetric aberration has been corrected, which has been sharpened and in which the color shift has been almost corrected. However, manufacturing variation and variation of a light source spectrum may cause the color shift to remain as shown by (C) in FIG. 9.

Thus, at step S24, the image processor 104 detects the color shift amount from the restored image. That is, the image processor 104 detects a shift amount between the two color components in the restored image shown by (B) or (C) in FIG. 9.

Next, at step S25, the image processor 104 performs the color shift correction process on the restored image to reduce the color shift amount detected at step S24 to produce the color shift corrected restored image. Then, at step S26, the image processor 104 outputs the color shift corrected restored image.

Since the color shift amount that is detected from the restored image shown by (B) in FIG. 9 is approximately 0, the color shift correction is not substantially performed on that restored image. However, the color shift amount is detected from the restored image shown by (C) in FIG. 9, so that the color shift correction is substantially performed on that restored image to produce the color shift corrected restored image shown by (D) in FIG. 9. The color shift corrected restored image is an image in which the asymmetric aberration of each color component has been corrected, which has been sharpened and in which the color shift has been corrected.

As described above, even though the image restoration filter includes the color shift correction effect, only performing the image restoration process using such an image restoration filter may allow the color shift to remain due to image degradation factors such as the manufacturing variation and the variation of the light source spectrum. Therefore, in order to surely acquire an output image in which the color shift has been also corrected, it is necessary to perform the color shift amount detection and the color shift correction process after the image restoration process has been performed.

Figure 10:
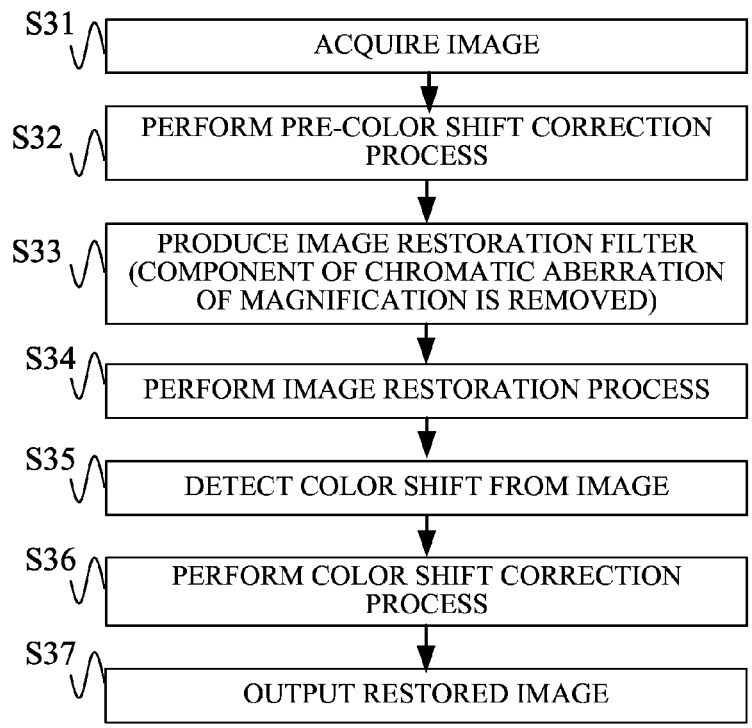
FIG. 10 is a flowchart of Modified Example 2 of the image processing sequence described in Embodiment 1.

Next, another modified example of this embodiment will be described with reference to a flowchart shown in FIG. 10. At step S31, the image processor 104 acquires the captured image that has produced by the image processor 104 itself or that is read from the recording medium 109, as the input image. The image processor 104 also acquires the image capturing condition information corresponding to the captured image.

Next, at step S32, the image processor 104 performs a pre-color shift correction process (input image color shift reduction process) that is a first stage color shift correction process on the captured image to correct a color shift (first color shift) included in the captured image. A color correction amount used in the pre-color shift correction process is a color correction amount corresponding to the actual image capturing condition selected from color correction amounts produced in advance according to design chromatic aberration of magnification of the image capturing optical system 101 and stored in the memory 108. The color correction amount may be set according to a detection result of the color shift amount in the captured image, as well as at step S35 described later.

Next, at step S33, the image processor 104 selects one image restoration filter corresponding to the actual image capturing condition. If no image restoration filter corresponding to the actual image capturing condition is stored in the memory 108, a new image restoration filter corresponding to the actual image capturing condition can be produced by the same method as that used at step S12 in FIG. 1.

The image restoration filter used in this modified example is a filter from which the effect of correcting (reducing) the color shift is removed since the color shift in the captured image has been almost corrected at step S32. In other words, the image restoration filter used in this modified example is a filter that corrects the asymmetric aberration and sharpens the image, but does not correct the color shift.

Next, at step S34, the image processor 104 performs the image restoration process on the captured image on which the pre-color shift correction process has been performed by using the image restoration filter that has been selected or produced at step S33 to acquire a restored image. The restored image is an image in which the color shift has been almost corrected at step S32, and in which the asymmetric aberration has been corrected and which has been sharpened by the above-described image restoration filter.

Next, at step S35, the image processor 104 detects a color shift amount (an amount of a second color shift) in the restored image. That is, a color shift amount is detected which remains due to the manufacturing variation or the variation of the light source spectrum though the pre-color shift correction process has been performed.

Then, at step S36, the image processor 104 performs a main color shift correction process (restored image color shift reduction process) that is a second stage color shift correction process on the restored image to reduce the color shift amount detected at step S35, and thereby produces a final color shift corrected restored image. The image processor 104 at step S37 outputs the final color shift corrected restored image.

In each of the above-described modified examples, correcting (reducing) the color shift amount detected in the step after the image restoration process enables acquisition of the restored image in which the color shift has been surely corrected.

Embodiment 2

Figure 11:
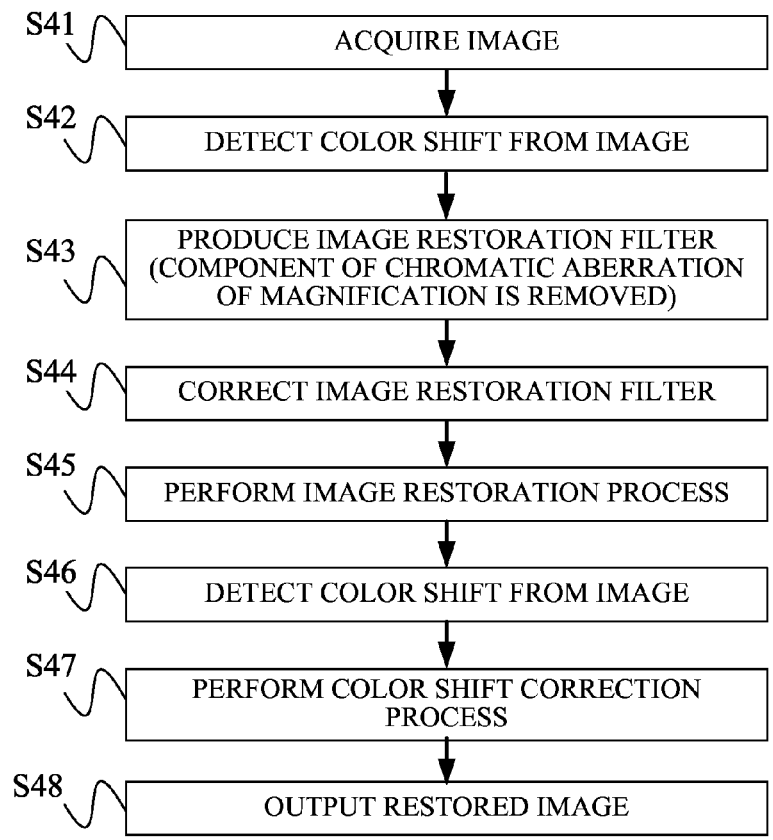
FIG. 11 is a flowchart of an image processing sequence performed by an image pickup apparatus that is Embodiment 2 of the present invention.

FIG. 11 shows a flowchart of image processing including an image restoration process performed according to an image processing method that is a second embodiment (Embodiment 2) of the present invention and a color shift correction process. The basic configuration of an image pickup apparatus that performs this image processing is common to that of the image pickup apparatus described in Embodiment 1, so that components of the image pickup apparatus in Embodiment 2 common to those in Embodiment 1 are denoted by same reference numerals as those in Embodiment 1. An image processor 104 as a computer executes the image processing according to an image processing program that is a computer program.

At step S41, the image processor 104 acquires a captured image that has produced by the image processor 104 itself or that is read from the recording medium 109, as an input image. The image processor 104 also acquires image capturing condition information corresponding to the captured image.

Next, at step S42, the image processor 104 detects a color shift amount corresponding to chromatic aberration of magnification from the captured image.

Next, at step S43, the image processor 104 selects from the memory 108 one image restoration filter corresponding to the image capturing condition (actual image capturing condition) obtained from the image capturing condition information. If no image restoration filter corresponding to the actual image capturing condition is stored in the memory 108, a new image restoration filter corresponding to the actual image capturing condition can be produced by the same method as that used at step S12 in FIG. 1.

The image restoration filter used in this embodiment is a filter from which the effect of correcting (reducing) the color shift. In other words, the image restoration filter used in this embodiment is a filter that corrects asymmetric aberration in the image and sharpens the image, but does not correct the color shift.

Next, at step S44, the image processor 104 corrects the image restoration filter on the basis of the color shift amount detected at step S42. Detailed description of the correction of the image restoration filter will be described later.

Next, at step S45, the image processor 104 performs the image restoration process on the captured image by using the image restoration filter corrected at step S44 to produce a restored image.

Next, at step S46, the image processor 104 detects a color shift amount from the restored image.

Then, at step S47, the image processor 104 performs the color shift correction process on the restored image on the basis of the color shift amount detected at step S46 to produce a color shift corrected restored image, and then outputs it at step S48.

Specific description of the correction of the image restoration filter performed at step S44 will hereinafter be made. This correction aims to perform the image restoration process in which individual differences due to manufacturing variation of the image capturing optical system 101 are reduced by utilizing information on the color shift obtained from the captured image.

Actually manufactured image pickup apparatuses have at least small individual variations due to manufacturing errors in shapes of lenses constituting the image capturing optical system 101 and in a lens holding mechanism or a lens driving mechanism. The individual variation influences the optical transfer function (OTF) of the image capturing optical system 101. Therefore, in order to perform a more highly accurate image restoration process for the individual variation, it is desirable to use an image restoration filter appropriately corrected according to an estimation result of an aberration state of each image pickup apparatus.

The influence of the manufacturing error includes one-sided blur. The one-sided blur is generated due to differences in image-forming performance among positions on the image sensor 102, the differences being caused by deterioration of rotational symmetry of the object image formed on the image sensor 102 due to mutual decentering of lenses constituting the image capturing optical system 101 which results from the manufacturing error of the image pickup apparatus.

Figure 12:
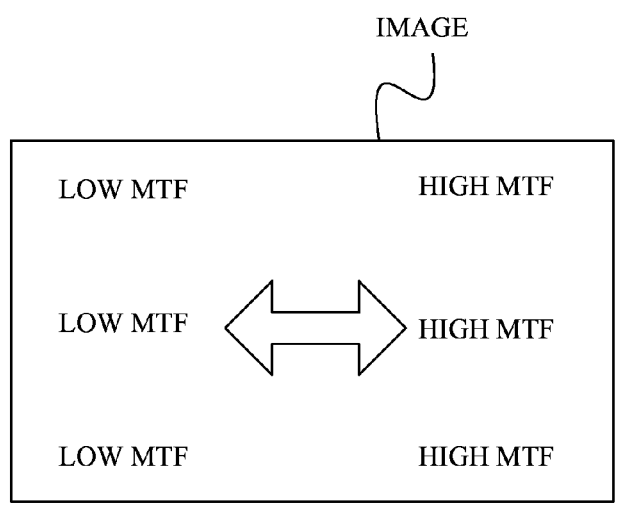
FIG. 12 shows performance variations due to manufacturing errors in Embodiment 2.

FIG. 12 shows an example of the one-sided blur in an image. With respect to an image-forming performance (MTF) obtained when there is no manufacturing error as a reference, the MTF is lower and thereby sharpness is lower on a left side of the image, and the MTF is higher and thereby the sharpness is higher on a right side thereof.

Figure 13:
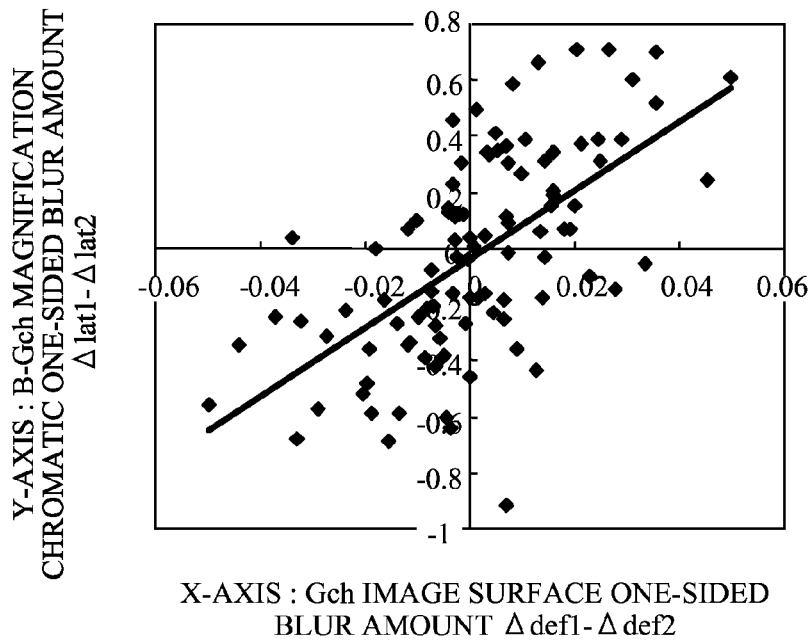
FIG. 13 shows a correlation between color shift and one-sided blur in Embodiment 2.

Next, description of a method of estimating the one-sided blur from the detected color shift amount will be made. First of all, the method detects the color shift amounts of edges included in the entire image by using the above-described color shift detection method. FIG. 13 shows a correlation between amounts of chromatic aberration of magnification of 100 image capturing optical systems having manufacturing variations and amounts of the one-sided blur.

If the amount of the one-sided blur can be estimated from the amount of the chromatic aberration of magnification, the amount of the one-sided blur can be estimated from a detected color shift amount. Furthermore, estimating variation of the OTF from the estimated amount of the one-sided blur enables correction of the image restoration filter based on the estimated variation of the OTF.

Figure 14A:
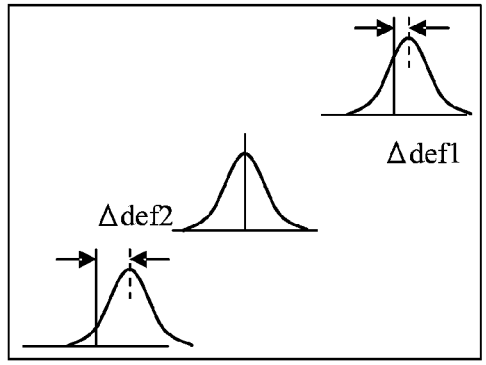
FIGS. 14A and 14B show calculation of the color shift and the one-sided blur in Embodiment 2.
Figure 14B:
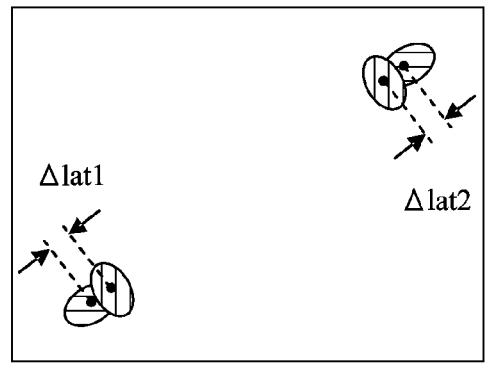

A vertical axis in FIG. 13 shows quantitatively evaluated values of asymmetry of the amounts of the chromatic aberration of magnification at image heights symmetric with respect to a center of the image. Specifically, the evaluation is made, as shown in FIG. 14B, by calculating a difference between centroids of the PSFs in the B and G channels as the color shift amount at two image heights (upper right and lower left image heights) symmetric with respect to the center of the image, and then by calculating a difference between the color shift amounts at these two image heights.

On the other hand, a horizontal axis in FIG. 13 shows quantitatively evaluated values of asymmetry of shift amounts of best focus positions (focus shift amounts) at the image heights symmetric with respect to the center of the image. Specifically, the evaluation is made, as shown in FIG. 14A, by calculating the focus shift amounts at the two image heights (upper right and lower left image heights) symmetric with respect to the center of the image in a state where the image capturing optical system is focused on the center of the image, and then by calculating a difference between the focus shift amounts at these two image heights. In curved graphs shown in FIG. 14A, a horizontal axis shows the optical axis direction (that is, a depth direction of the image), and a vertical axis shows values of the MTF at a certain evaluation frequency. A state where the MTF becomes maximum at an origin position on the horizontal axis shows a best focus state.

As understood from FIG. 13, there is a correlation between a one-sided blur characteristic of the chromatic aberration of magnification and a one-sided blur characteristic of the image surface (in-focus position). Therefore, storing an approximation curve shown in FIG. 13 in the memory 108 enables estimation of the one-sided blur amount that shows how much the focus is shifted at each image height, from the color shift amount detected in the captured image. Data of a correlation characteristic to be stored in the memory 108 is not limited to the approximation curve, and may be a look-up table.

Thus, this embodiment finds that there is a correlation between the color shift amount and the one-sided blur amount, and uses the detected color shift amount as a parameter of the image restoration process.

Although the method of calculating an image surface characteristic from the chromatic aberration of magnification has been described, aberration asymmetry other than the image surface characteristic may be estimated. Fur example, five Seidel aberrations including distortion may be estimated, and peripheral light intensity asymmetry may be estimated.

Figure 15A:
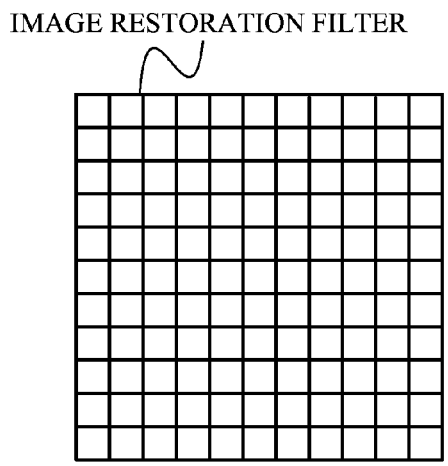
FIGS. 15A to 15D show correction of the image restoration filter in Embodiment 2.
Figure 15B:
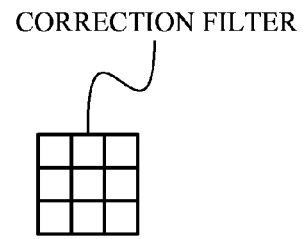

Next, description of a method of correcting the image restoration filter on the basis of the thus estimated shift amount from the design value of the image-forming performance in the image will be made with reference to FIGS. 15A and 15B. FIG. 15A shows an image restoration filter before the correction (hereinafter also referred to as "a non-corrected image restoration filter"), and FIG. 15B shows a correction filter to be used for the correction of the image restoration filter. In these figures, coefficient values of each filter are omitted.

As the correction filter, a high-pass filter or a low-pass filter can be used. Since the image restoration filter is produced based on the optical transfer function (OTF), it requires a large number of taps such as 11×11 taps or 51×51 taps. On the other hand, since the correction filter has only a function of increasing or decreasing the restoration gain of the image restoration filter, it can be constituted by a small number of taps such as 3×3 taps (in other words, it has a small data amount).

Figure 15C:
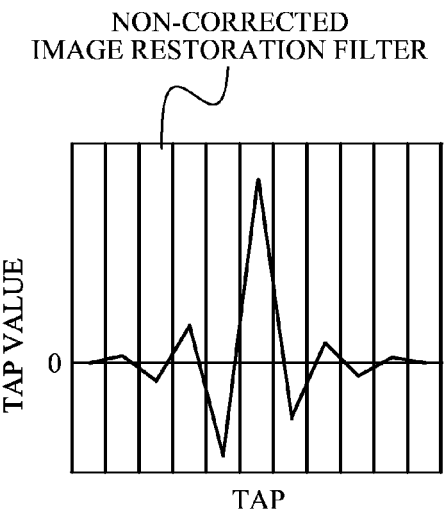
Figure 15D:
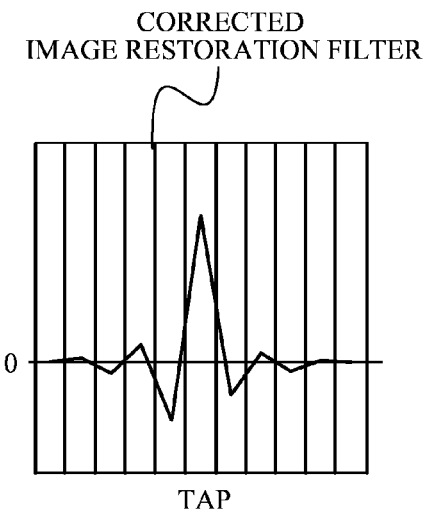

Performing convolution on the image restoration filter with the correction filter can correct a characteristic of the image restoration filter. A change in coefficients of the image restoration filter before and after the correction is shown in FIGS. 15C and 15D. FIG. 15C shows coefficient values of the non-corrected image restoration filter in its one section. FIG. 15D shows coefficient values of the image restoration filter after the correction (hereinafter also referred to as "a corrected image restoration filter") in the same section.

Figure 15E:
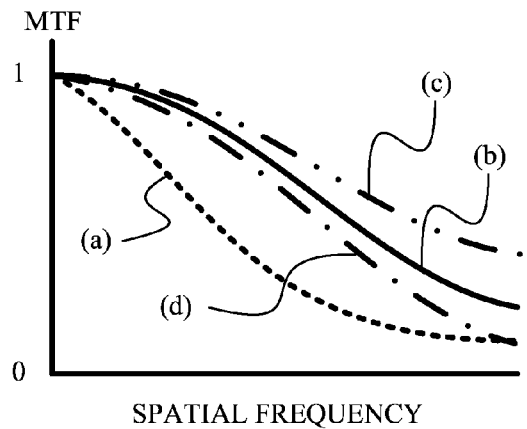
FIG. 15E shows MTF correction in Embodiment 2.

FIG. 15E shows a change of an MTF by the correction of the image restoration filter. In FIG. 15E, (a) shows an MTF before the image restoration process, (b) shows an MTF after the image restoration process using the non-corrected image restoration filter, (c) shows an MTF after the image restoration process using the corrected image restoration filter corrected by using a high-pass filter, and (c) shows an MTF after the image restoration process using the corrected image restoration filter corrected by using a low-pass filter.

Thus, this embodiment detects the color shifts reflecting the individual variation of the image capturing optical systems due to the manufacturing errors, and corrects the image restoration filter by using the detection results, which makes it possible to control MTF performance after the image restoration process.

Figures 16A, 16B:
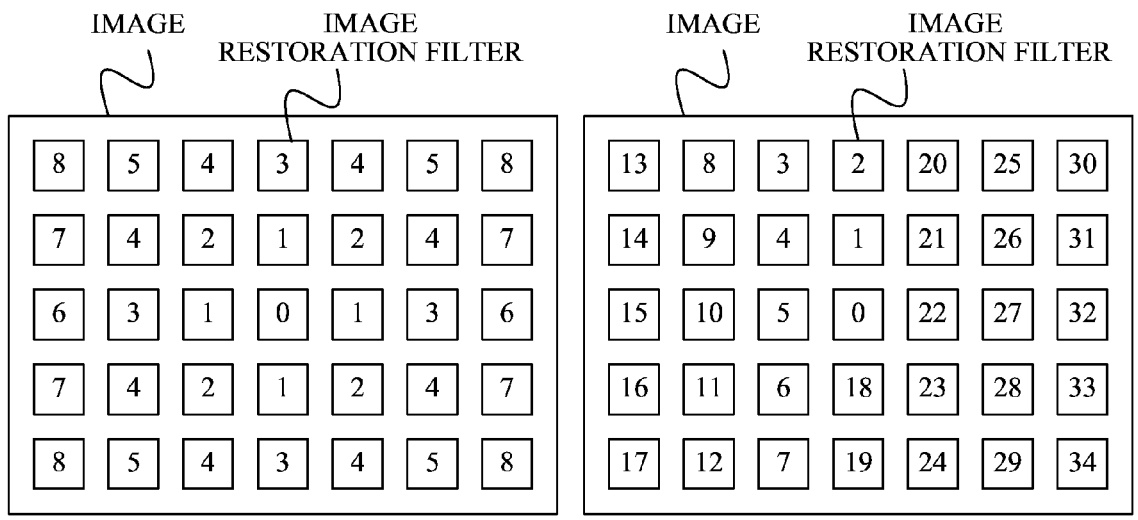
FIGS. 16A and 16B show correction of the image restoration filter in Embodiment 2.

FIGS. 16A and 16B respectively show examples of the image restoration filters before and after the correction, which are used at respective positions in an image. In each of FIGS. 16A and 16B, the image restoration filters are discretely prepared according to the respective positions in the image. The image restoration filters to which a same number is added are same filters (however, their directions are mutually different). In FIG. 16A, since the image capturing optical system has rotational symmetry, the same non-corrected image restoration filters are concentrically arranged.

On the other hand, FIG. 16B shows the corrected image restoration filters obtained by correcting the non-corrected image restoration filters shown in FIG. 16A according to the individual variation of the image capturing optical system. FIG. 16B shows the corrected image restoration filters corrected so as to be mutually different corresponding to the differences in image-forming performance at the respective positions in the image due to the manufacturing error.

The correction method of the image restoration filter to be used at step S44 is not limited to the above-described one, and the correction of the image restoration filter may be performed by amplification or suppression of the restoration gain in a frequency space. Moreover, it is possible to newly produce an image restoration filter having appropriate restoration gains (restoration degrees) for respective image heights.

Figure 17:
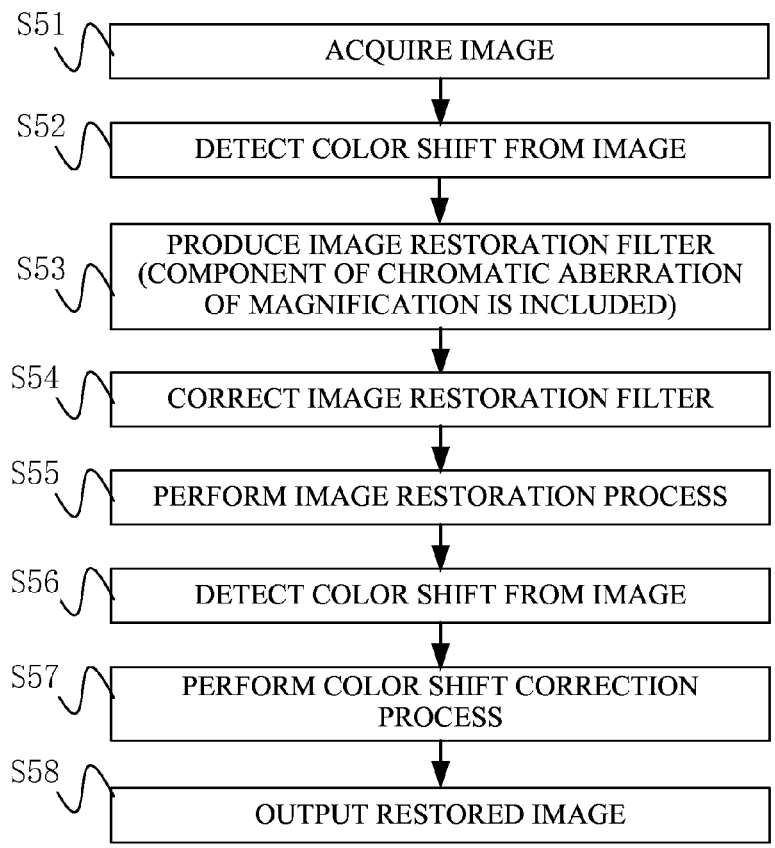
FIG. 17 is a flowchart of Modified Example 3 of the image processing sequence performed by the image pickup apparatus of Embodiment 2.

Next, a modified example of this embodiment will be described with reference to a flowchart shown in FIG. 17. At step S51, the image processor 104 acquires the captured image that has produced by the image processor 104 itself or that is read from the recording medium 109, as the input image. The image processor 104 also acquires the image capturing condition information corresponding to the captured image.

Next, at step S52, the image processor 104 detects the color shift amount from the captured image.

Then, at step S53, the image processor 104 selects from the memory 108 one image restoration filter corresponding to the actual image capturing condition obtained from the image capturing condition information. If no image restoration filter corresponding to the actual image capturing condition is stored in the memory 108, a new image restoration filter corresponding to the actual image capturing condition can be produced by the same method as that used at step S12 in FIG. 1. The image restoration filter in this modified example is a filter having the effect of correcting the color shift.

Next, at step S54, the image processor 104 corrects the image restoration filter that has been selected or produced at step S53 on the basis of the color shift amount detected at step S52. The correction method is as described above.

Next, at step S55, the image processor 104 performs the image restoration process on the captured image by using the corrected image restoration filter to acquire a restored image.

Next, at step S56, the image processor 104 detects the color shift amount from the restored image.

Then, at step S57, the image processor 104 performs the color shift correction process on the restored image on the basis of the color shift amount detected at step S56 to produce a color shift corrected restored image, and outputs the color shift corrected restored image at step S58.

Embodiment 3

Figure 18:
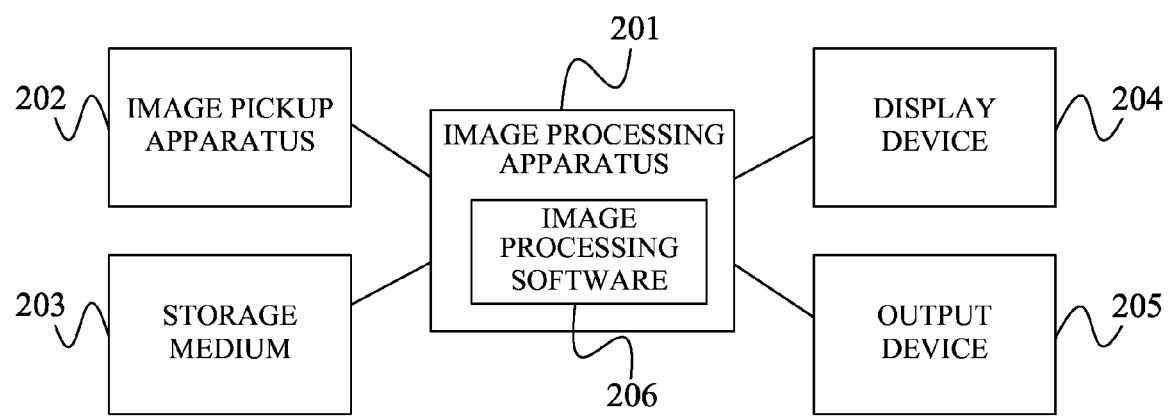
FIG. 18 shows the configuration of a system including an image processing apparatus that is Embodiment 3 of the present invention.

FIG. 18 shows a system configuration example in a case where the image processing described in each of the above embodiments is performed by an image processing apparatus 201 other than an image pickup apparatus 202.

The image processing apparatus 201 is a computer in which image processing software 206 including the image processing program described by using the flowchart in each of the above embodiments is installed. The image processing software 206 may include an image data development function and other image processing functions.

The image pickup apparatus 202 is an apparatus, such as a camera, a microscope, an endoscope and a scanner, which is provided with an image pickup system that photoelectrically converts an object image by an image sensor to produce a captured image.

A storage medium 203, such as a semiconductor memory, a hard disk or a network server, has a function of storing the captured image.

The image processing apparatus 201 acquires data of the captured image from the image pickup apparatus 202 or the storage medium 203 by wire communication or wireless communication, and performs the image processing described in each of the above embodiments to produce the color shift corrected restored image. Then, the image processing apparatus 201 outputs the color shift corrected restored image to at least one of an output device 205, the image pickup apparatus 202 and the storage medium 203 by wire communication or wireless communication.

Moreover, the image processing apparatus 201 can store data of the color shift corrected restored image in its internal memory.

The output device 205 includes, for example, a printer. A display device 204 as a monitor is connected with the image processing apparatus 201. A user can perform tasks relating to the image processing through this display device 204 or can evaluate the produced color shift corrected restored image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281843, filed on Dec. 17, 2010 which is hereby incorporated by reference herein in its entirety.

What is claimed is:

1. An image processing method comprising:
    a step of acquiring an input image produced by image capturing using an optical system;
    an image restoration step of performing an image restoration process on the input image to produce a restored image, the image restoration process using an image restoration filter produced based on an optical transfer function of the optical system;
    a color shift detection step of detecting color shift included in the restored image, the color shift corresponding to chromatic aberration of magnification of the optical system; and
    a restored image color shift reduction step of performing a color shift reduction process on the restored image to reduce the color shift detected in the color shift detection step,
    wherein the image restoration filter does not have an effect of reducing the color shift.

2. An image processing method according to claim 1, wherein the image restoration filter is produced based on a corrected optical transfer function obtained by removing a linear component corresponding to the chromatic aberration of magnification from a frequency characteristic of a phase of the optical transfer function.

3. An image processing method according to claim 1, wherein the image restoration filter is produced based on a corrected point spread function in which a difference between color components of a point spread function of the optical system is reduced by a relative parallel translation of the color components.

4. An image processing method according to claim 1, further comprising:
an input image color shift reduction step of performing a first color shift reduction process on the input image to reduce first color shift corresponding to the chromatic aberration of magnification included in the input image,
wherein, in the image restoration step, the method performs the image restoration process on the input image on which the first color shift reduction process has been performed, to produce the restored image,
in the color shift detection step, the method detects second color shift corresponding to the chromatic aberration of magnification included in the restored image, and
in the restored image color shift reduction step, the method reduces the second color shift by performing the color shift reduction process on the restored image.

5. An image processing method according to claim 1, wherein, in the image restoration step, the method detects the color shift corresponding to the chromatic aberration of magnification included in the input image, and produces the image restoration filter based on a detection result of the color shift.

6. A computer-readable storage medium storing an image processing program executed by a computer, the image processing program comprising:
a step of acquiring an input image produced by image capturing using an optical system;
an image restoration step of performing an image restoration process on the input image to produce a restored image, the image restoration process using an image restoration filter produced based on an optical transfer function of the optical system;
a color shift detection step of detecting color shift included in the restored image, the color shift corresponding to chromatic aberration of magnification of the optical system; and
a restored image color shift reduction step of performing a color shift reduction process on the restored image to reduce the color shift detected in the color shift detection step,
wherein the image restoration filter does not have an effect of reducing the color shift.

7. An image processing apparatus comprising:
an image acquiring part configured to acquire an input image produced by image capturing using an optical system;
an image restoring part configured to perform an image restoration process on the input image to produce a restored image, the image restoration process using an image restoration filter produced based on an optical transfer function of the optical system;
a color shift detecting part configured to detect color shift included in the restored image, the color shift corresponding to chromatic aberration of magnification of the optical system; and
a restored image color shift reducing part configured to perform a color shift reduction process on the restored image to reduce the color shift detected by the color shift detecting part,
wherein the image restoring filter does not have an effect of reducing the color shift.

8. An image pickup apparatus comprising:
an image pickup system configured to photoelectrically convert an object image formed by an optical system to produce an image; and
an image processing apparatus including:
an image acquiring part configured to acquire an image produced by the image pickup system as an input image;
an image restoring part configured to perform an image restoration process on the input image to produce a restored image, the image restoration process using an image restoration filter produced based on an optical transfer function of the optical system;
a color shift detecting part configured to detect color shift included in the restored image, the color shift corresponding to chromatic aberration of magnification of the optical system; and
a restored image color shift reducing part configured to perform a color shift reduction process on the restored image to reduce the color shift detected by the color shift detecting part,
wherein the image restoring filter does not have an effect of reducing the color shift.

9. An image processing method comprising:
a step of acquiring an input image produced by image capturing using an optical system;
an input image color shift reduction step of performing a first color shift reduction process on the input image to reduce first color shift corresponding to chromatic aberration of magnification of the optical system, the first color shift included in the input image;
an image restoration step of performing an image restoration process on the input image, on which the first color shift reduction process has been performed, to produce a restored image, the image restoration process using an image restoration filter produced based on an optical transfer function of the optical system;
a color shift detection step of detecting second color shift corresponding to the chromatic aberration of magnification, the second color shift included in the restored image, the color shift corresponding to the chromatic aberration of magnification of the optical system; and
a restored image color shift reduction step of performing a second color shift reduction process on the restored image to reduce the second color shift detected in the color shift detection step.

10. A computer-readable storage medium storing an image processing program executed by a computer, the image processing program comprising:
a step of acquiring an input image produced by image capturing using an optical system;
an input image color shift reduction step of performing a first color shift reduction process on the input image to reduce first color shift corresponding to chromatic aberration of magnification of the optical system, the first color shift included in the input image;
an image restoration step of performing an image restoration process on the input image, on which the first color shift reduction process has been performed, to produce a restored image, the image restoration process using an image restoration filter produced based on an optical transfer function of the optical system;
a color shift detection step of detecting second color shift corresponding to the chromatic aberration of magnification, the second color shift included in the restored image, the color shift corresponding to the chromatic aberration of magnification of the optical system; and a restored image color shift reduction step of performing a second color shift reduction process on the restored image to reduce the second color shift detected in the color shift detection step.

11. An image processing apparatus comprising:
an image acquiring part configured to acquire an input image produced by image capturing using an optical system;
an input image color shift reducing part configured to perform a first color shift reduction process on the input image to reduce first color shift corresponding to chromatic aberration of magnification of the optical system, the first color shift included in the input image;
an image restoring part configured to perform an image restoration process on the input image, on which the first color shift reduction process has been performed, to produce a restored image, the image restoration process using an image restoration filter produced based on an optical transfer function of the optical system;
a color shift detecting part configured to detect second color shift corresponding to the chromatic aberration of magnification, the second color shift included in the restored image, the color shift corresponding to the chromatic aberration of magnification of the optical system; and
a restored image color shift reducing part configured to perform a second color shift reduction process on the restored image to reduce the second color shift detected by the color shift detecting part.

12. An image pickup apparatus comprising:
an image pickup system configured to photoelectrically convert an object image formed by an optical system to produce an image; and
an image processing apparatus including:
an image acquiring part configured to acquire an image produced by the image pickup system as an input image;
an input image color shift reducing part configured to perform a first color shift reduction process on the input image to reduce first color shift corresponding to chromatic aberration of magnification of the optical system, the first color shift included in the input image;
an image restoring part configured to perform an image restoration process on the input image, on which the first color shift reduction process has been performed, to produce a restored image, the image restoration process using an image restoration filter produced based on an optical transfer function of the optical system;
a color shift detecting part configured to detect second color shift corresponding to the chromatic aberration of magnification, the second color shift included in the restored image, the color shift corresponding to the chromatic aberration of magnification of the optical system; and
a restored image color shift reducing part configured to perform a second color shift reduction process on the restored image to reduce the second color shift detected by the color shift detecting part.

* * * * *